Patented Feb. 4, 1936

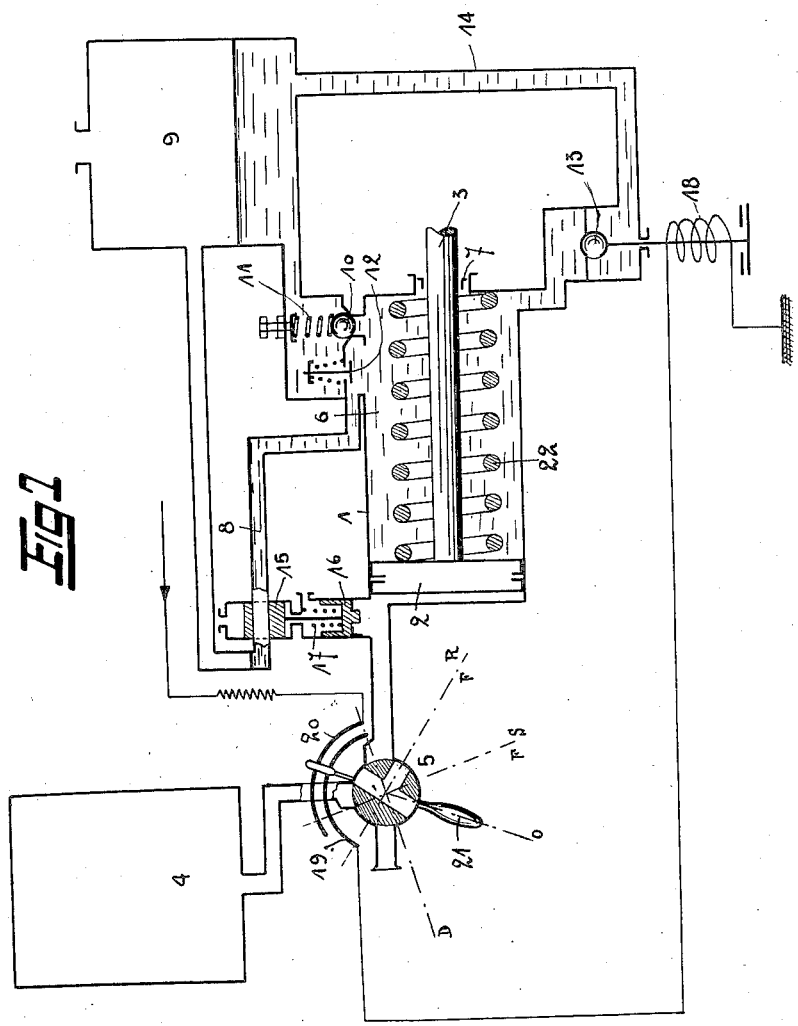

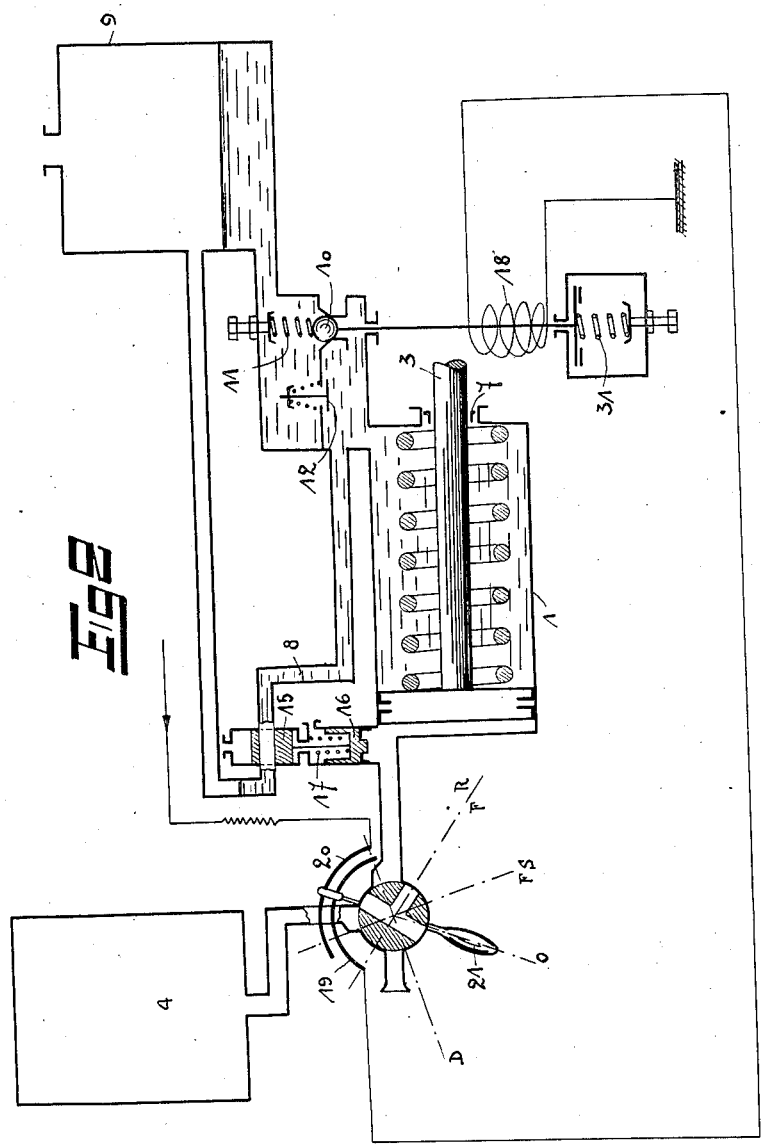

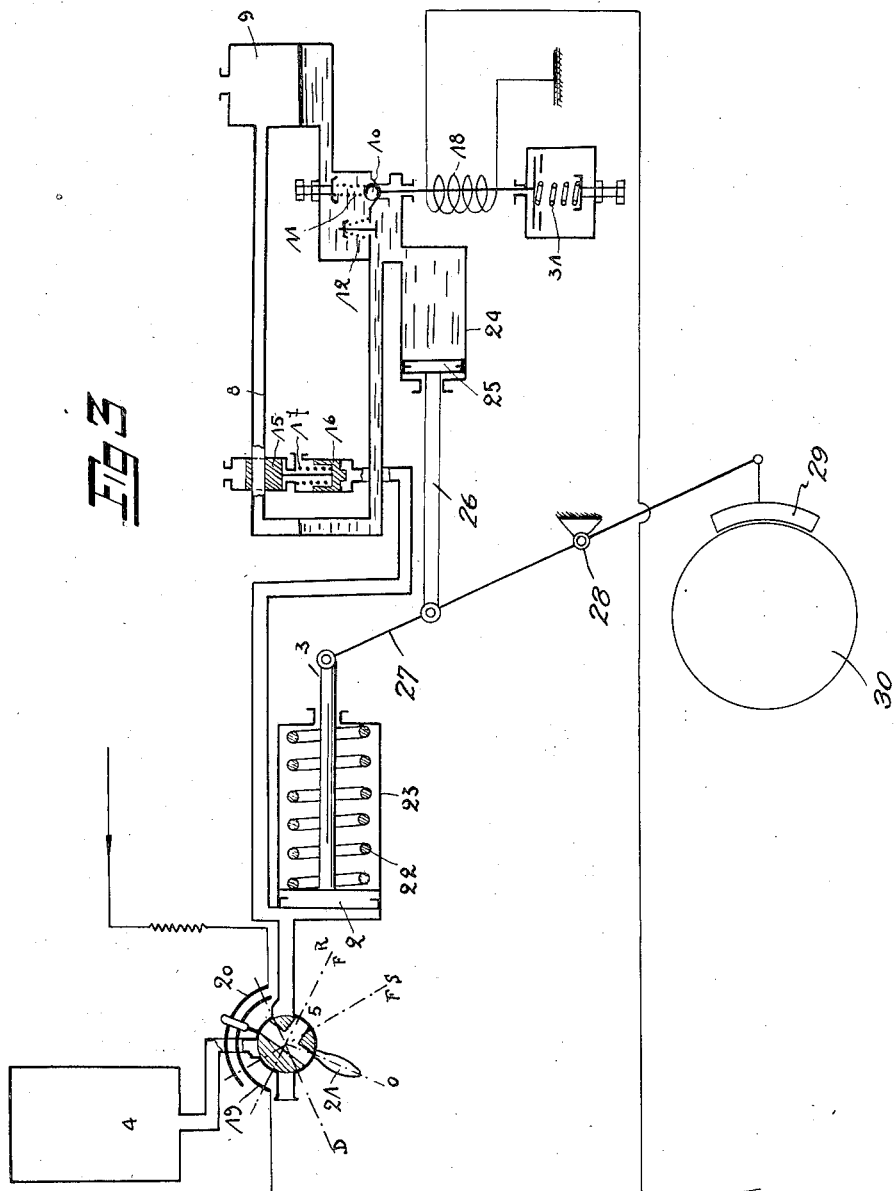

2,029,670

UNITED STATES PATENT OFFICE 2,029,670

BRAKE SYSTEM

Henri Pieper, Brussels, Belgium

Application August 17, 1934, Serial No. 740,322
In Belgium August 26, 1933

18 Claims. (Cl. 303—1)

This invention relates to brakes for vehicles, and more particularly to brakes for tramway and railway vehicles in which the braking operation takes place in two phases.

In brakes of the type to which the present invention is directed, the first displacement of the brake piston serves to bring the brake shoes against the vehicle wheels, and the second phase, corresponding to a slight displacement of the brake piston, is intended to press the shoes gradually against the wheels.

In order to obtain the maximum deceleration, it is necessary that the first phase be effected in the minimum time. Consequently, it is necessary to introduce the operating fluid into the cylinder through a very large aperture. This operation is very difficult because the brake pistons move with great speed, and it is not possible to obtain a gradual braking action.

In compressed air brakes, relatively small apertures are employed for introducing the compressed air into the cylinder, because with large apertures, it is impossible to moderate the braking action.

An object of the present invention is to provide a brake device including mechanism operable for rapidly moving the brake shoes into contact with the wheels without abruptly producing the maximum braking effect.

Another object of this invention is to provide a cylinder, a piston movable therein and connected to the brake shoes, and means operable upon movement of the shoes into contact with the wheels for increasing resistance to the flow of a liquid discharged from said cylinder by movement of said piston.

With these and other objects in view, the invention comprises the parts and combinations hereinafter set forth.

The device according to the invention is constructed in such a way—

(1) as to effect at the time of each braking, even at the time of moderate braking, the application of the whole of the braking force on the brake shoes (for example, the admission of the maximum pressure in the brake cylinder) so as to obtain a rapid application of the brake elements, and (2) to limit automatically the pressure of the brake elements on the wheels to a value corresponding to service braking, which is, for example, from 40 to 50% of the maximum braking.

For this purpose a cylinder is provided having a piston displaceable therein for forcing a liquid therefrom, the piston being connected to the brake shoes so that movement of said shoes toward the wheels causes the discharge of liquid from the cylinder. When the brake elements come into contact with the wheels, the discharge of the liquid from the aforesaid cylinder is effected through a valve opening towards the exterior of the cylinder against the action of a spring of given resistance in such a way as to maintain in this cylinder a counter-pressure which reduces to a given value, corresponding to the service braking, the maximum braking force applied to the brake shoes.

An increase of the braking effect above the value of the service braking is obtained according to the invention by producing the momentary or permanent opening of the aforesaid valve in such a way as to allow the liquid to escape from the cylinder so that the counter-pressure in the cylinder is eliminated for maximum braking.

According to one form of the invention, two paths are provided for the discharge of the liquid from the cylinder. One path is provided with a valve adapted to close automatically upon the brake shoes contacting with the wheels and the other is provided with a controlled valve.

The invention also applies to brakes actuated by fluid under pressure (air or liquid) and to brakes actuated by depression.

According to the invention the automatic closing of the valve provided in one of the discharge paths of the liquid is controlled by the effect of the reaction of application of the brake shoes, preferably by the pressure of the operating fluid in the brake cylinder.

In the drawings:

Figure 1 is a diagrammatic view of a brake actuating mechanism according to the present invention.

Fig. 2 is a similar view of a modified form of the present invention.

Fig. 3 is a similar view of a further modified form of the present invention.

As shown in Fig. 1, a brake shoe actuating rod 3 is carried by a piston 2 slidably mounted in the brake cylinder 1. A compressed air storage tank 4 is provided for supplying compressed air to the brake cylinder to displace the piston therein. Communication between the cylinder 1 and tank 4 is provided by means of conduits controlled by a three-way or triple valve 5. This valve serves not only to control the flow of air from tank 4 to cylinder 1, but to control the discharge or release of air from the cylinder 1 to the atmosphere. The space 6 of the rear side of the piston 2 contains a liquid, for example, oil, suitable packing 7 being provided in order to ensure tightness between the rod 3 and the cylinder.

This space 6 communicates by the duct 8 with a liquid receiver 9 open to atmospheric pressure and also by means of a duct provided with a valve 10 having a closing spring 11. A check valve 12 allows the liquid discharged during the braking to flow back into space 6 during the release of the brakes.

A third duct 14 provided with a valve 13 serves to place the space 6 in communication with the receiver 9. Valve 13 is maintained on its seat by energization of the electromagnet 18.

The valve 15, comprising the piston 16 and a suitably chosen spring 17, makes the space 6 directly communicating with the atmospheric pressure when the brake is released.

The valve 5 is provided with a conductor bridging the two contacts 19 and 20 to maintain the electromagnet 18 energized during the release of the brake (position D), the position of rest (position O), and service braking application (position F. S.).

In order to effect an emergency braking application, the handle 21 of the valve 5 is thrown to position F. R. In this position the circuit of the electromagnet 18 is broken and the valve 13 opened to place the space 6 in communication with the receiver 9 and consequently with the atmospheric pressure to relieve resistance to further movement of the piston 2 by compressed air.

The braking is as follows:

The handle 21 of the valve 5 is operated in such a way that the compressed air receiver 4 communicates with the brake cylinder 1. At this moment the space 6 on the rear side of the piston 2 communicates, through the duct 8, with the receiver 9, which is under atmospheric pressure.

The piston 2 moves with great speed until the shoes are applied against the wheels. At this moment, the pressure of the air rises in cylinder 1 because of the application of the shoes and the said air pressure overcomes resistance of the spring 17, causing valve 15 to close duct 8 and break communication between the space 6 and the receiver 9. After closure of valve 15, liquid may be discharged from cylinder 1 only through the spring-loaded valve 10 which creates in said cylinder a counter-pressure limiting the force created on piston 2 by the air pressure to a value corresponding to the service braking action.

The spring 11 of the valve 10 may be adjusted in such a way that in the brake applying position of normal use (F. S.) the application of the shoes against the wheels is obtained with a slight pressure, adjustable at will. During this phase of braking, a quantity of oil is discharged from the space 6 on the rear side of the piston 2 through the valve 10 into the receiver 9 under atmospheric pressure.

By stroking the handle 21 of the valve 5 towards the emergency brake applying position (F. R.), the circuit for conducting current to the electromagnet 18 is broken and valve 13 is unseated to allow oil to escape from the space 6 directly into the receiver 9. The displacement of oil from the space 6 permits the brake shoes to be pressed harder against the wheels increasing the braking effect. If only a slight increase in the braking effect is desired, the handle 21 is immediately returned to a position to reestablish the circuit through electromagnate 18 which, when energized, closes valve 13 to prevent an increase in the pressure between the brake shoes and the wheel.

In the case of emergency brake application, the handle of the valve is thrown in such a way that the piston moves without resistance and speedily acts in order to operate the maximum braking.

The tension of the spring 11 of the valve 10 is adjusted in order to obtain a braking effect from 30 to 35% to the weight of the vehicle, this braking effect being sufficient for normal use and retardings. During this phase of braking, it is possible to moderate the brake by operating the valve handle 21.

When the brake is released by placing the cylinder 2 in communication with the atmosphere, the piston is brought back to its initial position by the spring 22 and during this stroke of the piston, oil, which has been discharged from the space 6, is reintroduced into the space through the check valve 12.

Fig. 2 represents a device similar to that of Fig. 1 with the difference that there is no valve 13 and the electromagnet 18 directly operates the valve 10.

By energizing the electromagnet 18 in the case of emergency braking action, it is possible to place the space 6 in direct communication with the atmospheric pressure existing in receiver 9.

Fig. 3 shows another embodiment of the invention.

The brake transmision, comprising lever 27, fulcrum 28 and brake shoe 29, is operated by an ordinary air brake cylinder 23, but the reacting liquid and the valves 10, 12 and 15 are associated with an auxiliary cylinder 24 having a piston 25 connected to the brake transmission by a piston rod 26. The operation of this mechanism to apply the shoe 29 to wheel 30 is the same as in the case of Figs. 1 and 2.

I claim as my invention:—

1. In a brake system, a wheel having a braking surface a brake shoe, a power member for moving the brake shoe into contact with the braking surface, hydraulic means for resisting the application of the brake shoe against the braking surface, and means operable upon movement of the shoe into contact with the braking surface for controlling the hydraulic means to resist further movement of the shoe toward the braking surface and the increase of pressure between the shoe and braking surface.

2. In a brake system, a wheel having a braking surface, a brake shoe, a power member for moving the brake shoe into contact with the braking surface, a liquid-containing cylinder, a piston movable in said cylinder, means connecting the piston with the brake shoe so that movement of said shoe toward the braking surface will effect a displacement of the piston in said cylinder to discharge liquid therefrom, and means for automatically increasing the resistance to the discharge of liquid from said cylinder when the brake shoe contacts with the braking surface.

3. In a brake system, a wheel having a braking surface, a brake shoe, a power member for moving the brake shoe into contact with the braking surface, a liquid-containing cylinder, a piston movable in said cylinder, means connecting the piston with the brake shoe so that movement of said shoe toward the braking surface will effect a displacement of the piston in said cylinder to discharge liquid therefrom, a valve for controlling the discharge of liquid from said cylinder, and means operable for maintaining said valve open during movement of the shoe into contact with said braking surface and operable upon contact of said shoe with the braking surface to close said valve to resist an increase in the pressure of said shoe on the braking surface.

4. In a brake system, a wheel having a braking surface, a brake shoe, a power member for moving the brake shoe into contact with the braking surface, a liquid-containing cylinder, a piston movable in said cylinder, means connecting the piston with the brake shoe so that movement of said shoe toward the braking surface will effect a displacement of the piston in said cylinder to discharge liquid therefrom, a valve for controlling the discharge of liquid from said cylinder, means operable for maintaining said valve open during movement of the shoe into contact with said braking surface and operable upon contact of said shoe with the braking surface to close said valve to resist an increase in the pressure of said shoe on the braking surface, and a spring-loaded valve for controlling the discharge of liquid from said cylinder to obtain a predetermined pressure between the shoe and braking surface.

5. In a brake system, a wheel having a braking surface, a brake shoe, a power member for moving the brake shoe into contact with the braking surface, a liquid-containing cylinder, a piston movable in said cylinder, means connecting the piston with the brake shoe so that movement of said shoe toward the braking surface will effect a displacement of the piston in said cylinder to discharge liquid therefrom, a spring-loaded valve associated with said cylinder, means providing free discharge of liquid from said cylinder during movement of the shoe toward the braking surface and causing discharge through said spring-loaded valve after contact of the shoe with the braking surface, and means for adjusting the resistance of said spring to vary the pressure between the shoe and braking surface.

6. In a brake system, a wheel having a braking surface, a brake shoe, a power member for moving the brake shoe into contact with the braking surface, a liquid-containing cylinder, a piston movable in said cylinder, means connecting the piston with the brake shoe so that movement of said shoe toward the braking surface will effect a displacement of the piston in said cylinder to discharge liquid therefrom, a valve for controlling the discharge of liquid from said cylinder, means operable for maintaining said valve open during movement of the shoe into contact with said braking surface and operable upon contact of said shoe with the braking surface to close said valve to resist an increase in the pressure of said shoe on the braking surface, a spring-loaded valve for controlling the discharge of liquid from said cylinder to obtain a predetermined pressure between the shoe and braking surface, and means for opening said loaded valve to increase the pressure between the shoe and braking surface.

7. In a brake system, a wheel having a braking surface, a brake shoe, a power member for moving the brake shoe into contact with the braking surface, a liquid-containing cylinder, a piston movable in said cylinder, means connecting the piston with the brake shoe so that movement of said shoe toward the braking surface will effect a displacement of the piston in said cylinder to discharge liquid therefrom, said cylinder having two liquid discharge ducts, a valve in one duct, means for closing said valve upon movement of the shoe into contact with the braking surface, a valve in the second duct, and means operable for normally maintaining the valve in the second duct closed.

8. In a brake system, a wheel having a braking surface, a brake shoe, a power member for moving the brake shoe into contact with the braking surface, a liquid-containing cylinder, a piston movable in said cylinder, means connecting the piston with the brake shoe so that movement of said shoe toward the braking surface will effect a displacement of the piston in said cylinder to discharge liquid therefrom, said cylinder having two liquid discharge ducts, a valve in one duct, means for closing said valve upon movement of the shoe into contact with the braking surface, a valve in the second duct, means operable for normally maintaining the valve in the second duct closed, a receiver for receiving liquid discharged by the cylinder, a conduit for returning liquid from the receiver to the cylinder upon movement of the brake shoe away from the braking surface, and a check valve positioned in said conduit to permit free flow of liquid from the receiver to the cylinder and to prevent flow of liquid from the cylinder through said conduit.

9. In a brake system, a wheel having a braking surface, a brake shoe, a power member for moving the brake shoe into contact with the braking surface, a liquid-containing cylinder, a piston movable in said cylinder, means connecting the piston with the brake shoe so that movement of said shoe toward the braking surface will effect a displacement of the piston in said cylinder to discharge liquid therefrom, said cylinder having two liquid discharge ducts, a valve in one duct, means for closing said valve upon movement of the shoe into contact with the braking surface, a valve in the second duct, a spring-loaded valve in said second duct, and means for adjusting the effect of said spring to vary the resistance to discharge of liquid through said second duct.

10. A brake system according to claim 1, in which the power member comprises a cylinder and a piston adapted to be moved therein by compressed air.

11. A brake system according to claim 2, in which the power member comprises a cylinder and a piston adapted to be moved therein by compressed air.

12. In a brake system, a wheel having a braking surface, a brake shoe, a compressed gas motor comprising a cylinder, a brake piston movable therein, means connecting said piston to the brake shoe for moving the same into contact with the braking surface, a liquid-containing cylinder, a second piston movable in said liquid-containing cylinder and connected to the brake piston so that movement of the brake piston to apply the brake shoe against the braking surface will discharge liquid from the cylinder containing the same, said liquid-containing cylinder having two ducts for discharge of liquid therefrom, a valve in one duct, and pneumatic means responsive to an increase in pressure in the cylinder of the compressed gas motor due to contact of said shoe with the braking surface for closing said valve.

13. In a brake system, a wheel having a braking surface, a brake shoe, a compressed gas motor comprising a cylinder, a brake piston movable therein, means connecting said piston to the brake shoe for moving the same into contact with the braking surface, a liquid-containing cylinder, a second piston movable in said liquid-containing cylinder and connected to the brake piston so that movement of the brake piston to apply the brake shoe against the braking surface will discharge liquid from the cylinder containing the same, said liquid-containing cylinder having two ducts for discharge of liquid therefrom, a valve in one duct, pneumatic means responsive to an increase in pressure in the cylinder of the compressed gas motor due to contact of said shoe with the braking surface for closing said valve, and means in the other duct for normally closing the same.

14. In a brake system, a wheel having a braking surface, a brake shoe, a cylinder, a piston in said cylinder connected to said shoe, one end of said cylinder being filled with a liquid, means for supplying a fluid under pressure to the other end of the cylinder to act on said piston to displace the same and discharge liquid from the cylinder, and means operable upon movement of the shoe into contact with the braking surface for resisting the discharge of liquid from the cylinder.

15. In a brake system, a wheel having a braking surface, a brake shoe, a cylinder, a piston in said cylinder connected to said shoe, one end of said cylinder being filled with a liquid, means for supplying a fluid under pressure to the other end of the cylinder to act on said piston to displace the same and discharge liquid from the cylinder, said cylinder having two ducts for the discharge of liquid therefrom, a loaded valve in one duct normally closed, a valve in the second duct normally open for the free discharge of liquid from the cylinder, means operable upon movement of the shoe into contact with the braking surface for closing said normally-open valve so as to create a pressure on the liquid to reduce the pressure between the brake shoe and braking surface, a member for controlling admission of fluid under pressure into the cylinder, and means controlled by said member for opening said loaded valve.

16. In a brake system, a wheel having a braking surface, a brake shoe, a cylinder, a piston in said cylinder connected to said shoe, one end of said cylinder being filled with a liquid, means for supplying a fluid under pressure to the other end of the cylinder to act on said piston to displace the same and discharge liquid from the cylinder, said cylinder having two ducts for the discharge of liquid therefrom, a loaded valve in one duct normally closed, a valve in the second duct normally open for the free discharge of liquid from the cylinder, means operable upon movement of the shoe into contact with the braking surface for closing said normally open valve so as to create a pressure on the liquid to reduce the pressure between the brake shoe and braking surface, a member for controlling admission of fluid under pressure into the cylinder, electrical means for opening said loaded valve, and means associated with said control member for making and breaking an electrical circuit through said electrical valve-opening means.

17. In a brake system, a wheel having a braking surface, a brake shoe, pneumatic means for moving said brake shoe toward said braking surface, means for supplying a fluid under pressure to said pneumatic means, a valve for controlling the supply of fluid to said pneumatic means, a liquid-containing cylinder, a piston therein connected to the brake shoe to displace liquid from the cylinder upon movement of the shoe toward the braking surface, a liquid receiver, a conduit connecting said receiver with said cylinder, a normally-closed valve in said conduit, a second conduit, a normally-open valve in the second conduit, and means responsive to the increase in pressure in said pneumatic means upon contacting of the shoe with the braking surface to close said normally-open valve to build up a pressure on the liquid in said cylinder to offset an increase in the pressure of the shoe against the braking surface.

18. In a brake system, a wheel having a braking surface, a brake shoe, pneumatic means for moving said brake shoe toward said braking surface, means for supplying a fluid under pressure to said pneumatic means, a valve for controlling the supply of fluid to said pneumatic means, a liquid-containing cylinder, a piston therein connected to the brake shoe to displace liquid from the cylinder upon movement of the shoe toward the braking surface, a liquid receiver, a conduit connecting said receiver with said cylinder, a normally-closed valve in said conduit, a second conduit, a normally-open valve in said second conduit, means responsive to the increase in pressure in said pneumatic means upon contacting of the shoe with the braking surface to close said normally-open valve to build up a pressure on the liquid in said cylinder to offset an increase in the pressure of the shoe against the braking surface, and means operable upon an emergency application of the brake shoe for opening the normally-closed valve to provide for free discharge of liquid from said cylinder.

HENRI PIEPER.